Dec. 20, 1966 SHINE YASUOKA ETAL 3,293,359

MAGNETIC RECORDING AND REPRODUCING DEVICES

Filed Nov. 29, 1963 4 Sheets-Sheet 1

MAGNETIC RECORDING AND REPRODUCING DEVICES

Filed Nov. 29, 1963 4 Sheets-Sheet 2

United States Patent Office 3,293,359
Patented Dec. 20, 1966

3,293,359

MAGNETIC RECORDING AND REPRODUCING DEVICES

Shine Yasuoka, Toyonaka-shi, Shozo Aratani, Osaka, Ichiro Arimura, Kyoto, and Osahiko Yano, Osaka, Japan, assignors to Matsushita Electric Industrial Co., Ltd., Osaka, Japan, a corporation of Japan Filed Nov. 29, 1963, Ser. No. 326,800
Claims priority, application Japan, Dec. 1, 1962, 37/54,253; Dec. 28, 1962, 37/59,696
6 Claims. (Cl. 178—6.6)

The present invention relates to means for controlling a magnetic recording and reproducing device, and more particularly to means for driving a rotary head and a magnetic tape in a device adapted for recording and reproducing a broad-band signal comprising such magnetic tape and rotary head including magnetic transducers. According to the invention, such means for driving the rotary head and magnetic tape comprise a unique brushless D.C. synchronous motor which is adapted for rotation in precise synchronism with a reference signal without any use of a conventional power amplifier of complicated structure.

In prior methods of directly recording a signal such as a television signal having an extremely high frequency or ranging over an extremely broad frequency band on a magnetic tape adapted for magnetic recording, it has generally been necessary to provide an exceedingly great relative speed between a gap of a recording or reproducing head and a moving magnetic recording medium in order that high-frequency components of such signal can effectively be recorded or reproduced. On the other hand, the magnetic recording medium such as a magnetic tape has been required to run at an ordinary low speed. As a solution to satisfy both of these requirements, required relative speed between the tape and the recording head has been attained by mechanically rotating the magnetic head at a high speed in the transverse direction of the tape. According to said method, the tape is fed past said head in the longitudinal direction of said tape at a rate of 15 inches per second, and a signal is thereby recorded in the form of a series of traversing lines or tracks. When it is required to control the rotating speed or phase of the rotary head in the conventional magnetic recording and reproducing device having such rotary head, rotation of the rotary head has been controlled by an error signal obtained by comparing a signal dependent upon the rotation of the rotary head with a reference signal. Further, there must be a specific relation between the travelling speed of the tape during reproducing and the rotating speed of the rotary head. Therefore, the rotation of a tape driving motor has been controlled by an error signal obtained by comparison between a signal representing the travelling speed of the tape and the signal dependent upon the rotation of the rotary head. However, the devices with such systems require a multiplicity of parts and have a complicated mechanism with resultant high cost involved in the manufacture thereof.

With such drawbacks of the prior devices in view, the primary object of the invention is to provide an improved device adapted for recording and reproducing a broad-band signal having a magnetic tape and a rotary head including magnetic transducers, wherein brushless D.C. synchronous motors having said feature are used to provide simple means for full and precise control of the device.

Another object of the invention is to provide a device of said character wherein the brushless D.C. synchronous motors are used as a rotary head driving motor and a magnetic tape driving motor, which are synchronously driven by a control signal responsive to a reference signal source having a synchronous characteristic for forming required tracks of records on the magnetic tape.

Still another object of the invention is to provide a device of said character especially adapted for recording and reproducing a television signal wherein said brushless D.C. synchronous motors are used as a rotary head driving motor and a magnetic tape driving motor, which are synchronously driven by a control signal responsive to a synchronizing signal in the television signal to be recorded so as to form required recorded tracks of the television signal on the magnetic tape.

Yet another object of the invention is to provide a device of said character especially adapted for recording and reproducing a television signal wherein recorded tracks of the television signal are formed on the magnetic tape by the rotary head driven in synchronism with a control signal responsive to a synchronizing signal in the television signal to be recorded, and, at the same time, the synchronizing signal in said television signal is recorded on one edge of the tape so that said synchronizing signal can be utilized as a control signal during a reproducing operation.

A further object of the invention is to provide a device of said character adapted for recording and reproducing a television signal wherein the synchronizing signal in the television signal having been recorded along one edge of the magnetic tape during recording is reproduced from the magnetic tape during reproducing, and said signal is utilized as a control signal for driving the rotary head for reproducing the tracks of the television signal recorded on the magnetic tape.

A still further object of the invention is to provide a device of said character adapted for recording and reproducing a television signal comprising said brushless D.C. motors used as a rotary head driving motor and a magnetic tape driving motor, wherein an arrangement is made so that, during recording, said motors can be synchronously driven by a control signal responsive to a synchronizing signal in the television signal to be recorded in order to form recorded tracks of said television signal on the magnetic tape and at the same time record the synchronizing signal in said television signal on one edge of the magnetic tape, and, during reproducing, said synchronizing signal having been recorded on one edge of said magnetic tape can be reproduced, said signal being utilized as a signal to control said brushless D.C. synchronous motor for driving the rotary head for reproducing the recorded tracks of said television signal on the magnetic tape.

According to the invention, there is provided a device for recording and reproducing a broad-band signal comprising a magnetic tape, a rotary head including magnetic transducers, said transducers being adapted to successively sweep diagonally across said tape, a source for a reference signal having a synchronous characteristic, means for deriving a control signal responsive to said reference signal source, an electric motor for rotation in synchronism with said control signal, said motor being a brushless D.C. synchronous motor, and a D.C. power source for supplying power to said motor through a semi-conductor switching circuit, said control signal being operative to control said semi-conductor switching circuit for driving said motor.

There are other objects and particularities of the invention which will be obvious from the following description with reference to the accompanying drawings, in which.

Figure 4:
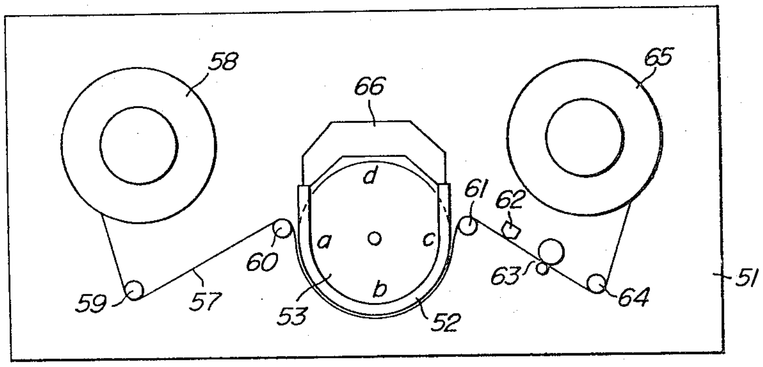
FIG. 4 is a plan view of an embodiment of a magnetic recording and reproducing device according to the invention.

In FIG. 4 and succeeding drawings, there is shown a magnetic recording and reproducing device according to the invention which is simplified in its method of driving a rotary head driving motor and a tape driving motor, and which provides ease of maintenance, simple and inexpensive structure and yet retains satisfactory performance.

Although some explanation has been given with regard to conventional devices, further detailed explanation thereof will assist in better understanding of the device of the invention which will be explained in full details in later description.

Figure 1:
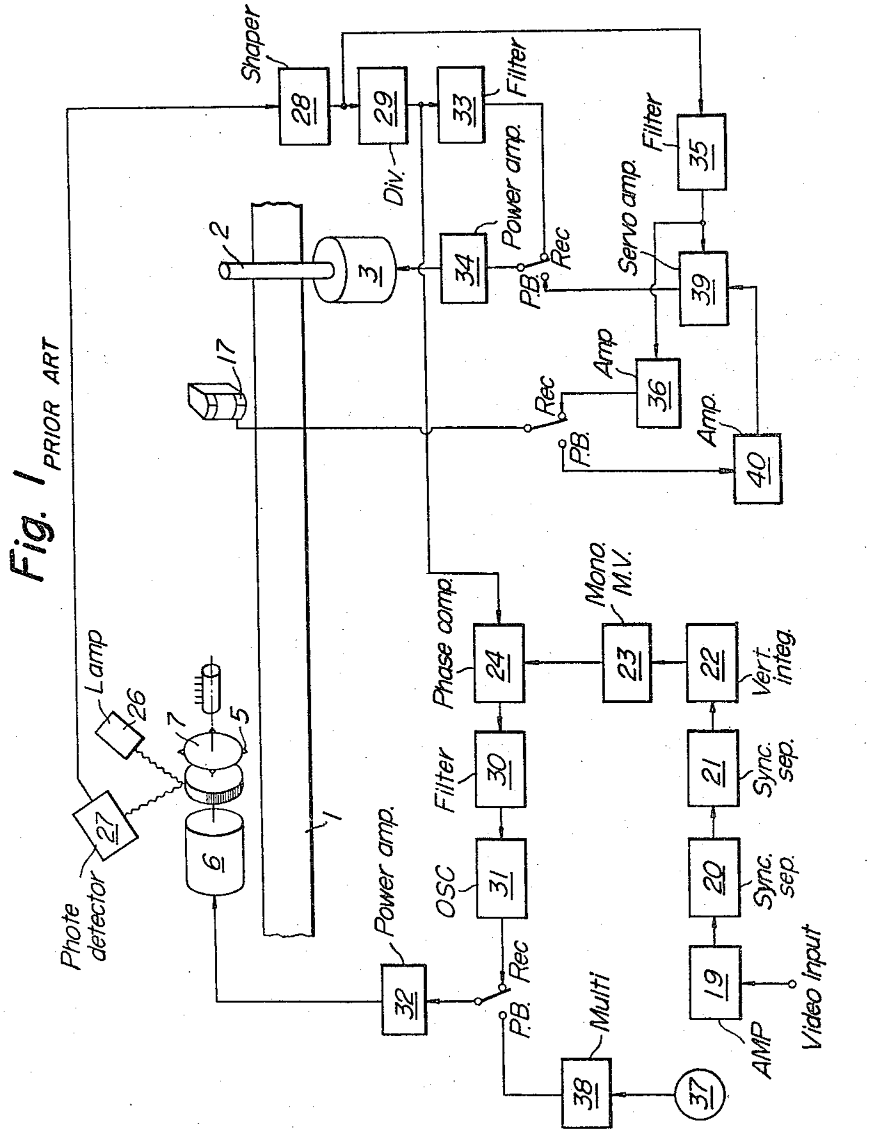
Fig. 1 PRIOR ART
FIG. 1 is a block diagram illustrating an outline of a motor driving system incorporated in a magnetic recording and reproducing device of conventional design.
Figure 2:
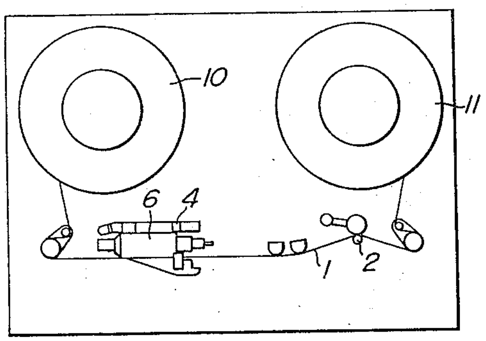
Fig. 2 PRIOR ART
FIG. 2 is a plan view of a tape driving system of the device of FIG 1.
Figure 3:
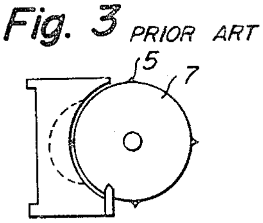
Fig. 3 PRIOR ART
FIG. 3 is an end elevational view showing a tape guide and a head drum in FIGS. 1 and 2.

An example of such conventional devices is illustrated in FIGS. 1–3. A magnetic tape 1 is supplied from a supply reel 10 and fed past a transducing head section 4. The tape 1 is then driven by a capstan mechanism 2 and taken up on a take-up reel 11. The transducing head section 4 comprises a head drum 7 having a plurality of transducing heads 5 driven by a synchronous motor. During recording and reproducing, a relation which will be described hereinunder is maintained between the rotating speeds of said head drum 7 and the capstan 2. To this end, a control signal is taken out of a video input signal and used to maintain such relation. Or more precisely, the video signal is supplied to an amplifier 19 during recording, thence fed to synchronizing signal separators 20 and 21 and a vertical integrator 22, wherein a vertical synchronizing signal component is solely separated to trigger a monostable multivibrator 23. Output of the multivibrator 23 is supplied to a phase comparator 24.

A signal having a frequency and phase corresponding to the rotating speed and phase of the head drum 7 can be obtained by a photo-detector 27 having a light source in the form of a lamp 26. This signal having a frequency of 240 cycles is shaped by a shaper 28 and divided by a divider 29 into a signal having a frequency of 60 cycles. Said signal is supplied to the phase comparator 24 to form another input thereto, and voltage is generated in the comparator 24, which voltage is proportionate to the phase difference between said another input and the input from the multivibrator 23. Said signal from the comparator 24 is supplied to an oscillator 31 through a filter 30 and used to control an oscillation frequency of the oscillator 31. The output of the oscillator 31 is amplified by a power amplifier 32 and supplied to the synchronous motor 6. The phase comparator 24 is operative in response to the phase difference between the two input signals, and this phase difference varies depending on the position of the head drum 7. The difference in the phases causes variation in the phase of the oscillator 31, in which a voltage output is thereby generated. The speed of said motor 6 is thereby increased or decreased, and the head drum can be rotated in synchronism with the vertical synchronizing signal in the video signal being recorded.

The output of the divider 29 is also supplied to a filter 33 wherein it is converted into a sine wave, which is then amplified by a power amplifier 34 and supplied to a capstan motor 3. Thus, the capstan motor 3 can be driven at a rotating speed directly related to the rotating speed of the head drum 7. Therefore, the capstan 2 rotates following the rotation of the head drum 7. The tape 1 travels a predetermined distance in the longitudinal direction thereof during each rotation of the head drum 7. The output from the shaper 28 is also supplied through a filter 35 and a control track amplifier 36 to a control signal recording head 17 to form a control track along an edge of the tape 1.

In case of reproducing, a signal obtained from a suitable power source 37 having a frequency of 60 cycles is converted by a multivibrator 38 into a signal having a frequency of 240 cycles, which is amplified by an amplifier 32 and supplied to the synchronous motor 6 for driving the head drum 7. A signal responsive to the rotation of the head drum 7 is obtained by the photo-detector 27 in the same manner as in the case of recording, and the signal is supplied through the shaper 28 and the filter 35 to a phase comparator incorporated in a servo-amplifier 39 for the capstan. The control signal recorded on the longitudinal edge of the tape 1 is reproduced by the control head 17 and supplied, in the form of a second signal, through a reproducing amplifier 40 to the phase comparator in said servo-amplifier 39. The comparator is operative to generate, in the servo-amplifier 39, a voltage proportionate to phase difference between the two signals, and the signal thereby generated is supplied through a filter to an oscillator to control the oscillation frequency of the oscillator having a value of 60 cycles.

The output of the oscillator is amplified by the power amplifier 34 and supplied to the capstan motor 3. The phase comparator in the servo-amplifier 39 is operative in response to the phase difference between the two input signals, and the phase difference generates an output which will vary the frequency of the oscillator to a higher or lower value. The speed of the head drum 7 is thereby controlled, and the tape 1 is made to travel a predetermined distance during each rotation of the head drum 7. Thus, plurality of heads 5 can accurately follow the recorded tracks.

From the foregoing description, it will be seen that the conventional device as explained above is expensive due to such complicated mechanism. In contrast thereto, the invention provides a device adapted for recording and reproducing a broad-band signal which is featured by the ease of maintenance and simple means of recording and reproducing. The invention will be described with reference to a preferred embodiment thereof.

Figure 5:
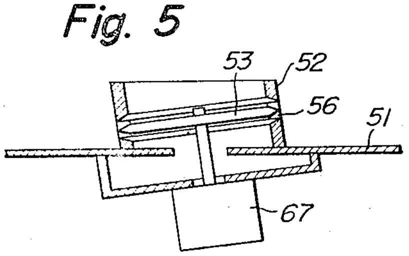
FIG. 5 is a vertical sectional view of part of the device of FIG. 4.

In FIG. 4, there is shown a tape driving mechanism of the device according to the invention in which a rotary magnetic head is arranged to be directly driven by a reference signal. The tape driving mechanism includes a base plate 51 which is commonly called a tape transport panel. A tape guide 52 is cylindrical and has a gap 56 through which tips of two magnetic heads 54 and 55 provided at the peripheral edge of a rotary head drum 53 can protrude as shown in FIG. 5. The axis of the tape guide 52 is slightly inclined with respect to the line perpendicular to the base plate 51. Therefore, the rotary head drum 53 coaxially disposed in the tape guide 52, and a motor for driving said rotary head drum 53 also have the same inclination with the tape guide 52 with respect to the base plate 51.

A magnetic tape 57 is supplied from a supply reel 58, guided past a first idler roller 59 and a second idler roller 60 onto the tape guide 52 at one end thereof. The first idler roller 59 has an axis perpendicular to the base plate 51, while the second idler roller 60 has an axis parallel with the axis of the tape guide 52 for making the tape 57 abut the tape guide 52 and has its mounted position slightly adjustable. After recording or reproducing by the magnetic heads 54 and 55 mounted in the rotary head drum 53, the magnetic tape 57 is guided outwardly at the other end of said tape guide 52, fed past another second idler roller 61, control signal record reproducing head 62, capstan mechanism 63 and another first idler 64, and taken up on a take-up reel 65.

An electromagnetic shielding member 66 is disposed behind the tape guide 52 to provide shielding through a semi-circular arc *adc* thereof, at which the tape guide 52 is not in abutment with the tape 57 so that any unnecessary noise may not be picked up by the magnetic heads 54 and 55 during a period when they do not sweep the tape 57. The shielding member 66 is made of such material as copper or iron to provide the required shielding effect.

Figure 6:
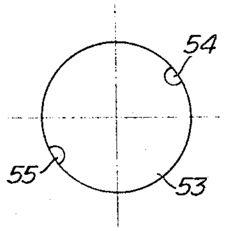
FIG. 6 is a plan view of a rotary head drum of the device shown in FIG. 4.
Figure 7:
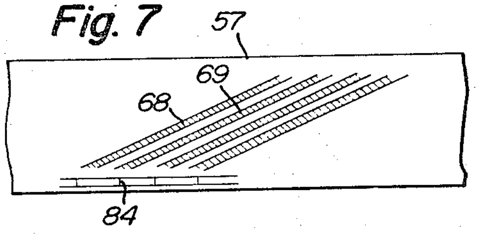
FIG. 7 is a view showing recorded tracks on a magnetic tape by the device of FIG. 4.

FIG. 6 shows a sectional view of the rotary head drum 53. It will be seen that the head drum has a center 0, and the two magnetic heads 54 and 55 are disposed on opposite ends of the diametral line therof. The rotary head drum 53 is a rotating body which is driven by a unique synchronous motor shown in FIG. 5. Said rotary body is disposed at a slight inclination with respect to the travelling direction of the tape 57. Therefore, it will be apparent that, when the magnetic tape 57 is made to travel along the periphery of the rotary body 53 in abutting relation therewith, magnetized bands formed on the magnetic tape by the magnetic heads 54 and 55 will be as shown at 68 and 69 in FIG. 7. By suitably selecting the positions of the second idler rollers 60 and 61, the abutting range between the tape 57 and the heads 54 and 55 can be limited to the semi-circular rotation range of each magnetic head. Thus, one magnetic head will start to abut the tape as soon as the other magnetic head disengages the tape.

Hereinunder, description will be made with reference to a case wherein the device according to the invention is adapted for recording and reproducing a television signal.

In the device shown in FIGS. 4–7, the rotary head drum 53 has a diameter of 22 cm. The magnetic heads 54 and 55 mounted in the rotary drum 53 are made of Alpern ferrite and have an impedance of the order of 1 KΩ at a frequency of 3 mc. For the synchronous motor for driving the rotary head drum 53, a four-pole brushless D.C. synchronous motor is used, which will be explained in detail in later description. The motor rotates at 1800 r.p.m. when supplied with a D.C. voltage of the order of 30 v. at a synchronizing input frequency of 60 cycles.

The magnetic tape 57 takes the form of a video tape having a width of 1 inch comprising an iron oxide coating applied on a thin base. The magnetic tape 57 is made to travel at a speed of about 38 cm./sec. along the semi-circular arc *abc* of the rotary head drum 53. From the above relation, the relative speed between the magnetic heads and the magnetic tape will become about 20 m./sec. Since the rotary head drum 53 has an inclination of about 3 degrees with respect to the travelling direction of the tape, tracks drawn by the magnetic heads 54 and 55 will be such as are shown by numerals 68 and 69 in FIG. 7. The positions of the idler rollers 60 and 61 are so selected that the abutting range between each of the magnetic heads 54 and 55 and a magnetic tape 57 is limited to the semi-circular arc *abc*.

When each head has a gap of 2 $\mu$m. and each recorded track has a width of 300 $\mu$m. under the above arrangement, it is possible to obtain an output at a peak-to-peak value of about 1 mv. between terminals of the magnetic heads, and a frequency up to about 3.5 mc. can be recorded and reproduced.

Next, description will be made with reference to one form of said brushless D.C. synchronous motor. The brushless D.C. synchronous motor comprises a field winding composed of coils of a switching circuit having switching elements such as transistors or semiconductor rectifiers with control electrodes (S.C.R.), and a rotor in the form of a permanent magnet. In the synchronous motor, an electromotive force is generated between the magnetic field formed in the field winding by the action of the switching circuit and the rotor of the permanent magnet to provide continuous rotation of the rotor. Further, an external sychronizing signal is impressed on said switching circuit for rotating said permanent magnet rotor at a synchronous rotating speed corresponding to a frequency of said external synchronizing signal, so that thereafter the permanent magnet rotor is rotated at the synchronous speed corresponding to the frequency of said external synchronizing signal independently of the load carried thereby. Or more precisely, pick-up coils in which voltage is induced by the rotation of the permanent magnet rotor are connected in series with secondary coils of a coupling transformer which is used to impress the external synchronizing signal on control terminals of said switching circuit. Therefore, number of revolutions of the rotor can automatically and precisely be pulled in to be synchronized with the external synchronizing signal without requiring any special means for comparing the number of revolutions of the rotor with the frequency of the external synchronizing signal after the motor has been started.

Figure 9:
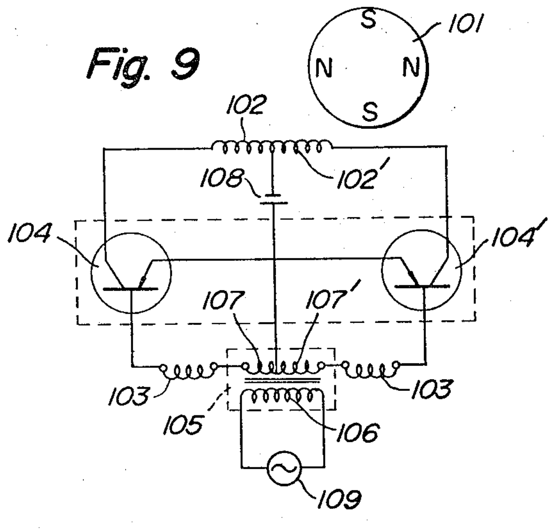
FIG. 9 is a connection diagram of a brushless D.C. synchronous motor and a driving circuit therefor, said motor being used to drive the rotary head drum of the device of the invention.

Referring to FIG. 9, there is shown a connection diagram of the brushless D.C. synchronous motor in which the permanent magnet rotor is shown at 101, and driving coils are denoted by 102 and 102'. Numerals 103 and 103' denote the pick-up coils, and 104 and 104' denote the transistors. The coupling transformer 105 for the external synchronizing signal comprises a primary coil 106 and secondary coils 107 and 107'. The driving coils 102 and 102' and the pick-up coils 103 and 103' are wound about a stator iron core to form the field winding. In the pick-up coils 103 and 103', a voltage at a frequency corresponding to the number of revolutions of the permanent magnet rotor 101 is induced during the rotation of the rotor.

The driving coils 102 and 102' are connected through a D.C. source 108 to the emitters and collectors of the respective transistors 104 and 104'. Further, the pick-up coils 103, 103' and the secondary coils 107, 107' of the coupling transformer 105 are connected in series, respectively. These series circuits are connected to the emitters and bases of the respective transistors 104 and 104' to form a push-pull transistor switching circuit. The external synchronizing signal 109 is impressed on the primary coil 106 of the coupling transformer 105, and applied to said transistor switching circuit through the coupling transformer 105.

The synchronous motor operates in the following manner. When no external synchronizing signal is impressed on the coupling transformer 105, current generated in the driving coils 102 and 102' by the oscillating action of the circuit of the transistors 104 and 104' will magnetize the stator poles to thereby drive the rotor. By the voltage induced in the pick-up coils 103 and 103' by the rotation of the permanent magnet rotor, the oscillating action of the transistors 104 and 104' is controlled to rotate the rotor at an inherent number of revolutions.

When the external synchronizing signal is impressed on the primary coil 106 of the transformer 105 after the motor has been started, and provided that the frequency of the voltage induced in the pick-up coils 103 and 103' corresponding to the inherent number of revolutions of the motor would be within a suitable range (for example, the frequency of the voltgae induced in the pick-up coils being in the order of 50∼120 cycles per second against the frequency of the external signal of 60 cycles per second), the switching action of the transistors 104 and 104' is influenced by the external synchronizing signal and the number of revolutions of the permanent magnet rotor 101 gradually approaches the synchronous number of revolutions corresponding to the frequency of the external signal, since the pick-up coils 103 and 103' are connected in series with the secondary coils 107 and 107' of the coupling transformer 105, respectively. At the same time, the voltage induced in the pick-up coils 103 and 103' also approaches the external signal until finally the voltage induced in the pick-up coils 103 and 103' has a frequency and phase approximately analogous to those of the external signal. Then, the permanent magnet rotor 101 rotates in synchronism with the frequency of the external synchronizing signal, and thereafter any variation in the frequency of the external signal is followed by the permanent magnet rotor 101, which varies its speed accordingly and continues its synchronous rotation.

As described above, in the brushless D.C. synchronous motor with the above arrangement and feature, on-off control of exciting current generated in its driving coils can be effectively performed by the switching action of the switching elements. Thus, by suitably establishing the relation between the inherent number of revolutions and the frequency of the external synchronizing signal when no external signal is impressed on the motor, the motor can automatically be pulled into rotate at the synchronous speed corresponding to the external signal in an extremely simple and precise manner without any provision of special synchronizing means.

Figure 8:
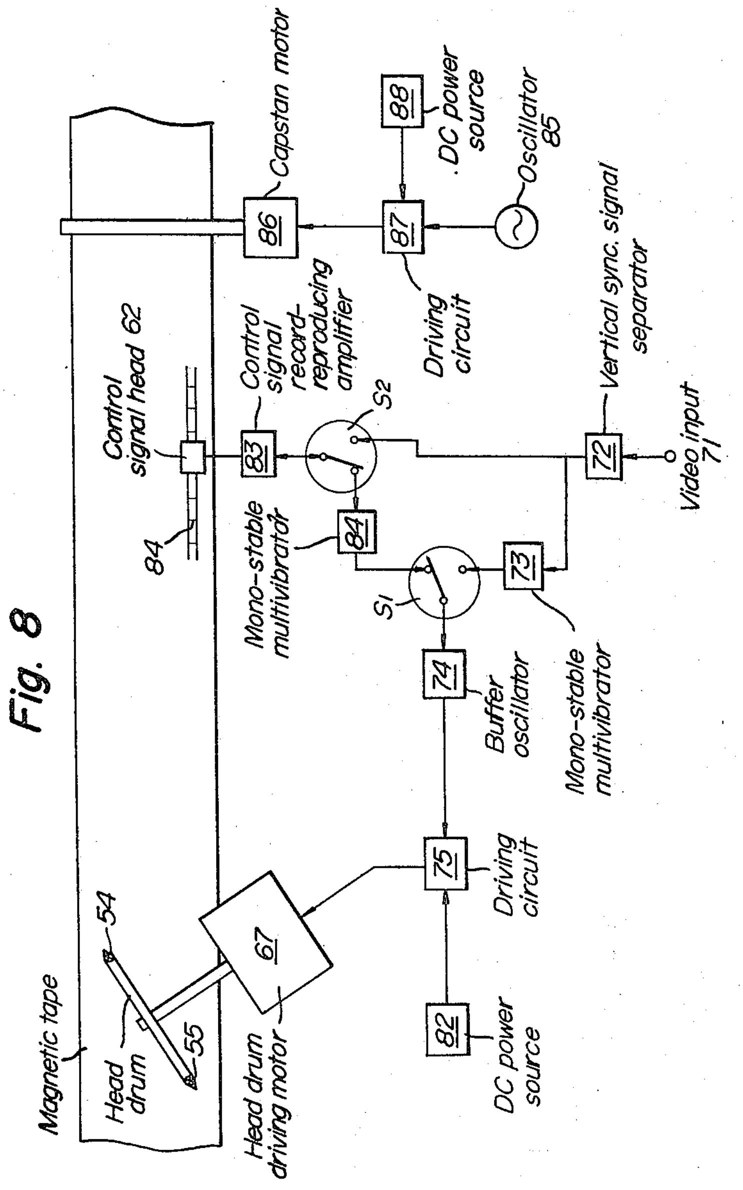
FIG. 8 is a block diagram showing an outline of a motor driving system of the device according to the invention.

Now, in FIG. 8, a composite video signal taken out of a teleevision receiver or television camera, during recording, is made to be impressed on input terminals 71 and led to a vertical synchronizing signal separator 72 where the vertical synchronizing signal alone is separated. The signal triggers a monostable multivibrator 73, output of which is fed past a switch S1 to lock a buffer oscillator 74. The output frequency of the buffer oscillator is 60 cycles per second, which is the same frequency with that of the vertical synchronizing signal. The output of the buffer oscillator 74 controls a driving circuit 75, while power is supplied from a D.C. power source 82 through the driving circuit 75 to the head drum driving motor 67.

When the rotary head driving motor takes the form of the four-pole brushless D.C. synchronous motor as described above, it rotates at 1800 r.p.m. in strict synchronism with said vertical synchronizing signal. Therefore, the abutting time of the magnetic heads 54 and 55 with the magnetic tape 57 is exactly $\frac{1}{60}$ second which corresponds with 1 field of a television information.

On the other hand, the composite video signal is modulated by a suitable modulator such as an FM modualtor, and introduced into the heads 54 and 55 through a recording amplifier. At the same time, the vertical synchronizing pulse separated by the vertical synchronizing signal separator, 72 is passed through a switch S2 and shaped and amplified by a control signal record reproducing amplifier 83. Then, the pulse is recorded as a control signal track 84 on one edge of the magnetic tape by the control signal head 62.

As described above, FIG. 7 shows the magnetized bands recorded on the tape by said recording process, wherein the diagonal tracks 68 and 69 are recorded by the magnetic heads 54 and 55, while the track 84 at the lower end of the tape is recorded by the control signal head 62.

During reproducing, the control signal on the magnetic tape is reproduced by the control signal head and triggers the monostable multivibrator 84 through the amplifier 83 and switch S2. The output of the multivibrator 90 is passed through the switch S1 and used to trigger the buffer oscillator 74 as in the case of recording. By the output of the buffer oscillator 74, the driving circuit 75 is controlled to rotate the rotary drum driving motor 67 in synchronous relation.

On the other hand, an eight-pole brushless D.C. synchronous motor is used as a capstan motor 86 for driving the tape. The capstan shaft has a diameter of about 8.1 mm. and is driven at a rate of 900 revolutions per minute by being supplied with power from a 30 v. D.C. source 88. In this case, a driving circuit 87 is controlled by a synchronizing signal developed by a separately provided oscillator 85 at a frequency of 60 cycles per second. Thus, the tape speed of about 15 inches per second can be maintained throughout the recording and reproducing operations. In lieu of the output signal from the oscillator 85, the vertical synchronizing signal (60 c./s.) in the television signal broadcast wave, for example, may be used.

It is desirable that the time at which the magnetic heads 54 and 55 start to abut the tape and the time at which they disengage the tape during recording lie within the vertical blanking period. Or more precisely, the period, $\frac{1}{60}$ second, of the vertical synchronizing signal is equal to the time of one tracing range of the tracks 68 and 69 drawn by the magnetic heads 54 and 55 on the tape, and the magnetic heads rotate in strict synchronism with the vertical synchronizing signal. Therefore, by suitably selecting a value of the delay time of the monostable multivibrator 73, the rotating phase of the magnetic heads may be determined so that the change-over position of the magnetic heads may lie in the vertical blanking period to thereby satisfy the above requirements. Thus, even when any disorder may take place in the signal at the change-over portion of the magnetic heads, it will not appear on the screen of a television receiver during reproducing.

Further, during reproducing, the magnetic heads 54 and 55 are rotated in synchronism with the reproduced control signal, as described above. It will be seen that, by adjusting the phase of said control signal to have a suitable value by means of the multivibrator 90, the magnetic heads 54 and 55 can accurately trace right above the tracks 68 and 69 drawn during the recording.

It will be apparent from the foregoing explanation that, according to the device of the invention, the tape driving method and the rotary head drum driving method are extremely simplified compared with the recording and reproducing devices of conventional design. Therefore, the device of the invention can be manufactured at low cost and has an extremely good stability in its performance with attendant ease of maintenance.

According to conventional devices wherein common hysteresis synchronous motors are used to drive the capstan and rotary head drum, the capstan motor is driven, during recording, by a signal which is obtained by demultiplying and shaping a signal taken out by the rotation of the rotary head drum and by amplifying the signal by a power amplifier. During reproducing, a signal taken out by the rotation of the rotary head drum is shaped and its phase is compared with the phase of a control signal taken out of a control signal head. The error voltage therebetween is used to control a variable frequency oscillator, an output signal of which is subjected to power amplification and used to drive the capstan motor. As for the rotary head drum, the phase of the vertical synchronizing signal derived from a video signal is compared with the phase of a signal taken out by the rotation of the rotary head drum during recording, and the error signal therebetween is used to control a variable frequency oscillator, an output frequency of which is amplified by a power amplifier and used to drive the head drum motor. During reproducing, a frequency of output signal of a separately installed standard oscillator is subject to power amplification and the signal so obtained is used to drive the rotary head drum.

In contrast thereto, according to the device of the invention, the brushless D.C. synchronous motors as described above are used to drive the capstan and the rotary head drum. Thus, the power amplifier of complicated structure used in the conventional devices is entirely unnecessary. Since, further, the motors rotate in strict synchronism with the weak synchronizing signal, there is no need of making the comparison between the phase of the reference synchronizing signal and the actual rotating phase of the motor. Therefore, the vertical synchronizing pulse in the video signal can be recorded intact by the control signal head in lieu of recording the signal corresponding to the rotation of the rotary head drum to obtain the control signal, and it will be apparent that this will simplify the structure required for the proper operation.

Further, a low-voltage D.C. source can be used as the power source for the motors for driving the rotary head drum and the capstan. Therefore, a low-voltage D.C. source such as a battery for automotive vehicles may be effectively utilized.

Although the invention has been described with reference to the specific embodiment, it will be understood that the invention is in no way limited to such embodiment and various changes and modifications may be made without departing from the spirit of the invention.

What is claimed is:

1. A device for recording and reproducing a broadband signal comprising a magnetic tape, a rotary head including a magnetic transducer, said transducer being adapted to successively sweep diagonally across said tape, a source for a reference signal having a synchronous characteristic, means for deriving a control signal responsive to said reference signal source, an electric motor for rotation in synchronism with said control signal, said motor being a brushless D.C. synchronous motor, and a D.C. power source for supplying power to said motor through a semiconductor switching circuit, said control signal being operative to control said semiconductor switching circuit for driving said motor.

2. A device for recording and reproducing a broadband signal comprising a magnetic tape, a rotary head including a magnetic transducer, said transducer being adapted to successively sweep diagonally across said tape, a source for a reference signal having a synchronous characteristic, means for deriving a control signal responsive to said reference signal source, two electric motors for rotation in synchronism with said control signal, said motors being brushless D.C. synchronous motors, a D.C. power source for supplying power to each of said motors through a semiconductor switching circuit, said control signal being operative to control said semiconductor switching circuits for driving said motors, and means for forming recorded tracks on said magnetic tape by said rotary head rotating by being fixed on the shaft of one of said motors, the other of said motors being operative to drive said magnetic tape.

3. A device for recording and reproducing a television signal comprising a magnetic tape, a rotary head including a magnetic transducer, said transducer being adapted to successively sweep diagonally across said tape, means for deriving a control signal responsive to a synchronizing signal in said television signal, two motors for rotation in synchronism with said control signal, said motors being brushless D.C. synchronous motors, a D.C. power source for supplying power to each of said motors through a semiconductor switching circuit, said control signal being operative to control said semiconductor switching circuits for driving said motors, and means for forming recorded tracks of said television signal on said magnetic tape by said rotary head rotating by being fixed on the shaft of one of said motors, the other of said motors being operative to drive said magnetic tape.

4. A device for recording and reproducing a television signal comprising a magnetic tape, a rotary head including a magnetic transducer, said transducer being adapted to successively sweep diagonally across said tape, means for deriving a control signal responsive to a synchronizing signal in said television signal, a synchronous electric motor for rotation in direct synchronism with said control signal, means for forming recorded tracks of said television signal on said magnetic tape by said rotary head rotating by being fixed on the shaft of said motor, and means for recording the synchronizing signal in said television signal on one edge of said magnetic tape.

5. A device for recording and reproducing a television signal comprising a magnetic tape, a rotary head including a magnetic transducer, said transducer being adapted to successively sweep diagonally across said tape, means for deriving a control signal responsive to a synchronizing signal in said television signal, a synchronous electric motor for rotation in direct synchronism with said control signal, means for forming recorded tracks of said television signal on said magnetic tape by said rotary head rotating by being fixed to the shaft of said motor, means for recording the synchronizing signal in said television signal on one edge of said magnetic tape, means for reproducing said recorded synchronizing signal for obtaining an electrical signal responsive to said synchronizing signal, and means operative by said electrical signal for driving said motor for rotating said rotary head for reproduction of the recorded tracks formed on said tape.

6. A device for recording and reproducing a television signal comprising a magnetic tape, a rotary head including a magnetic transducer, said transducer being adapted to successively sweep diagonally across said tape, means for deriving a control signal responsive to a synchronizing signal in said television signal, an electric motor for rotation in synchronism with said control signal, said motor being a brushless D.C. synchronous motor, a D.C. power source for supplying power to said motor through a semiconductor switching circuit, said control signal being operative to control said semiconductor switching circuit for driving said motor, means for forming recorded tracks of said television signal on said magnetic tape by said rotary head rotating by being fixed on the shaft of said motor, means for recording the synchronizing signal in said television signal on one edge of said magnetic tape, means for reproducing said recorded synchronizing signal for obtaining an electrical signal responsive to said synchronizing signal, and means operative by said electrical signal for driving said motor for rotating said rotary head for reproduction of the recorded tracks of said television signal on said magnetic tape.

References Cited by the Examiner

UNITED STATES PATENTS 3,179,870 4/1965 Maxey ------------- 178—6.6

DAVID G. REDINBAUGH, *Primary Examiner.*

H. W. BRITTON, *Assistant Examiner.*